Figure 1:
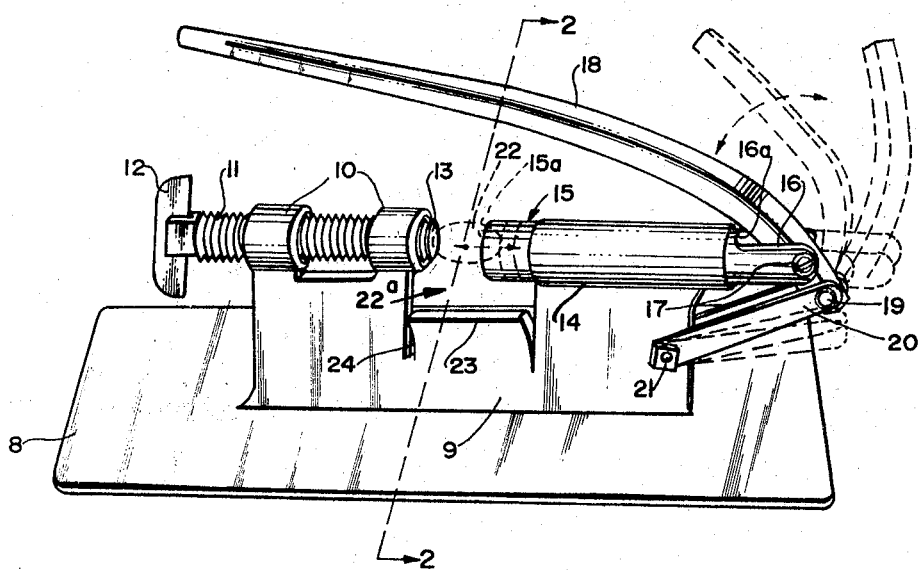

March 28, 1967     G. VETTER     3,311,143

NUT CRACKER OR THE LIKE

Filed Oct. 7, 1964

INVENTOR
GEORGE VETTER

BY Eugene E. Stevens and
Raymond H. Stevens

ATTORNEYS

United States Patent Office 3,311,143
Patented Mar. 28, 1967

3,311,143
NUT CRACKER OR THE LIKE
George Vetter, R.R. 1, Benton, Mo. 63736
Filed Oct. 7, 1964, Ser. No. 402,085
6 Claims. (Cl. 146—16)

My invention relates to improvements in nut crackers and the like, and particularly to nut crackers which are especially adapted for the commercial cracking of pecans so that the meat will not be broken into pieces and will be removable in undamaged halves.

The invention contemplates a device as characterized which is simple in construction, easy to operate, economical to manufacture in quantity, and which is conveniently adjustable to operate upon nuts, etc., of varying sizes.

A further object of the invention is to provide a novel base-carried flange-form wall which, in addition to providing opposed and spaced top edge-carried bearings for cracking elements, also has a laterally bent cracked nut deflector providing portion between said bearings for directing cracked nuts to the opposite wall side where a receiving receptacle may be provided.

Additional and more specific invention objects having to do with the above noted novel bearing-carrying flange-like wall are (1) that one end of the latter provides a pivot connection for a novel floating link means whose other end is pivoted to the rear end of a nut-cracking slide member-operating lever which latter operates in one of the bearings; and (2) that the width of each of the aforementioned wall-carried bearings so exceeds the wall width as to prevent damage to both the afore-noted nut deflector and floating link means in the event that the unit is inadvertently dropped on a hard surface or otherwise roughly handled.

Further objects and advantages of the invention will be readily apparent to those versed in the art upon reference to the accompanying drawing showing a presently preferred form of the invention. However, it is to be understood that the disclosure is to be taken as illustrative rather than limitative, since various changes may be made within the spirit and scope of the invention as claimed hereinafter.

Referring to the drawing wherein the same reference characters designate the same parts throughout the several views—

Figure 2:
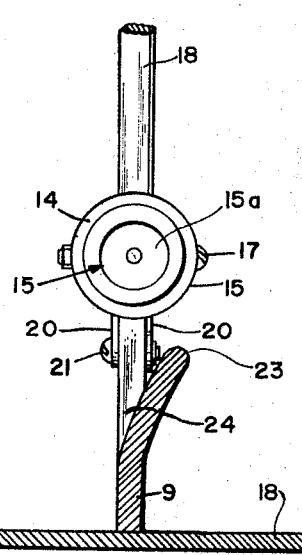
Figure 3:
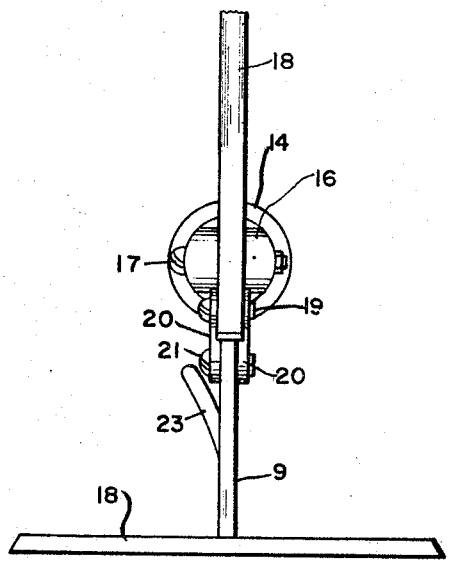

FIG. 1 is a perspective view of a nut cracker embodying my invention;

FIG. 2 is a cross-sectional view taken on the line 2—2 of FIG. 1 and showing the nut deflector; and FIG. 3 is a rear end elevational view of a slight modification of the device of FIG. 1 wherein a thinner upstanding wall 9 is used and a diametrically larger sleeve bearing 14.

Referring to the drawing by reference characters, numeral 8 designates the plate-like base from the central portion which rises a flange-like wall 9 which is located inwardly of opposite sides and ends of the base and preferably centrally of the latter.

In carrying out the invention, the top edge of the flange 9 at one end of the latter is provided with functionally integral tapped bearings 10 which receive the nut cracking screw element 11 having at its outer end the operating finger piece 12. The inner end of this nut cracking screw element 11 is recessed as indicated at 13 to receive one end of a pecan nut 22. This screw threaded nut cracking element 11 will preferably be adjusted so that its recessed end 13 will extend a predetermined distance into the nut receiving space 22a according to the average size of the nuts to be cracked. Thus, in practical operation of the device, it is only the companion nut cracking slide bar element 15 which needs to be manipulated in order to crack the nut.

The nut cracker slide bar 15 works in a sleeve-like bearing 14 which is welded or otherwise made functionally integral with the top edge of the wall or flange 9 as is clearly shown in the drawings. Both bearings 10 and 14 extend beyond the planes of opposite sides of wall 9 as shown.

The nut cracking slide bar 15, as shown, is of a length considerably longer than the length of the sleeve-like bearing 14 in which said bar slides. The rear end of the slide bar 15 is bifurcated as indicated at 16 to provide the end slot 16a through which extends the inner portion of the operating lever 18 for said bar. The inner end of the lever 18 extends substantially beyond the bifurcation 16 as indicated.

The lever 18 has its inner end provided with a bearing hole through which extends the bifurcation-carried pivot pin 17 which spans the bifurcation provided slot 16a. The inner end portion of the lever 18 which extends below the bifurcation provided slot is pivoted as at 19 to the outer ends of floating companion links 20 which are disposed on opposite sides of the upstanding flange or wall 9 as is clearly shown in the drawing. The inner ends of the floating links 20 are pivoted as at 21 to opposite sides of the outstanding wall or flange 9 as is clearly shown.

Thus, in the operation of the lever 18 to retract and project the nut cracking slide bar 15 toward and away from the nut receiving space 22a, the links float so that the lever will actuate the nut slide bar 15 without subjecting it to any vertical binding in bearing 14.

Particular attention is directed to the fact as shown in the drawing that when the lever 18 is thrown clockwise as indicated in dotted lines in FIG. 1 to retract slide bar 15, the outer ends of the floating links 20 will engage the underportion of the bifurcated slide bar end 16 to limit the outward movement of lever 18 and leave it upstanding for convenient grasp by the operator. Also, at the time that the outer ends of the floating links 20 engage the bifurcation 16 of the slide bar, as aforesaid, the recessed—15a—nut cracking end of the slide bar 15 will be flush or substantially flush with the inner end of the sleeve bearing 14 so that but limited movement of the slide bar will be required to engage and crack the nut 22.

Also in order to relieve the bifurcation carried pivot pin 17 of strain, the counterclockwise or operative movement of lever 18 is limited by its engagement with the rear end of the sleeve-bearing 14 as shown.

From the foregoing description, it will be evident that the screw member 11 is pre-set according to the average size of nut of the batch to be cracked, and the set screw element 11 is left at that setting. The nut 22 is inserted into the space 22a between the bearings and one end engaged in the recess 13 at the inner end of the screw member 11. Then the lever 18 is swung counterclockwise to engage the other end of the nut 22 in the recess 15a at the inner end of the slide bar 15. A gentle pressure on the bar effects cracking of the nut and upon reverse movement of the lever 18 the nut 22 drops onto the deflector 23 to fall to one side of flange 9 where a shallow nut-receiving receptacle (not shown) may be provided. The nut deflector 23 is provided by inward slitting of the flange 9 adjacent the inner ends of each of the screw and sleeve bearings 10, 14.

A particularly advantageous feature of the construction shown and described is that since the screw 11 and sleeve bearings 10, 14 are wider than the supporting flange or wall 9 and extend to opposite sides of the latter, and beyond the planes of the link means 20 and nut deflector 23, both of the latter will be protected against injury in the event that the unit is inadvertently dropped on a hard surface. It is also of advantage in the above regard to locate the upstanding flange or wall 9 inwardly of the sides and ends of the base 8, as shown in FIG. 1.

From the foregoing, it will be apparent, among other things, that the links 20 provide for smooth non-binding operation of the slide member 15 and also function as stop elements as earlier noted herein. Additionally, the upstanding wall 9 has multiple functions in that it provides deflector 23; a pivot connection for floating links 20 and the bearings 10, 14 which latter protect both 23 and 20 in the event the unit is dropped or otherwise subjected to rough handling.

Having thus described my invention, what I claim is:

1. A nut cracker or the like comprising in combination a base, a functionally integral flange rising from said base and providing a top edge, spacedly opposed first and second bearings fixedly carried by and rising above the top edge of said flange, said bearings being axially aligned with said flange and with each other, the spacement of said bearings providing a nut-receiving area therebetween above the top edge of the intermediate portion of said flange, cooperating nut cracking members axially shiftable in the respective first and second bearings and having opposed and recessed inner ends movable into said nut-receiving area to engage a nut therein, one of said nut cracking members being a screw member threaded into the first bearing and having finger piece at its outer end, the other cracking member comprising a slide bar working in the second bearing and having a slot-providing bifurcation at its outer end which bifurcation is always disposed at the outer end of said second bearing, an operating lever for said slide bar and providing an inner end portion extending through the bifurcation-provided slot of said slide bar and toward said base, a pivot pin carried by said bifurcation and extending across said slot, said inner lever end portion having a bearing hole through which said pivot pin extends, whereby said lever is movable about said pivot pin, floating link means pivoted at one end to said flange below and inwardly of the plane of outer sides of said second bearing, a pivot connection between the other end of said floating link means and the lower end of said lever below and spaced from the bifurcated portion of said slide bar.

2. The structure of claim 1, and said lever being engageable with the rear end of said second bearing to limit its movement in one direction and said floating link means engageable with the bifurcated slide bar end to limit lever movement in the opposite direction.

3. The structure of claim 1, and the flange being vertically slotted from its top edge at the site of the opposed inner ends of said bearings, and being bent laterally so as to provide a cracked nut deflector for deflecting the latter toward the opposite side of said flange for deposit in an adjacent receptacle.

4. The structure of claim 3 and said deflector being located inwardly of the plane of the adjacent sides of both the first and second bearings, whereby to be protected against damage in the event that the nut cracker unit is dropped on a hard surface.

5. The structure of claim 1, and said floating link means comprising separate links located at opposite sides of said flange and lever end.

6. The structure of claim 1, said lever being engageable with the rear end of said second bearing to limit its movement in one direction and said floating link means engageable with the bifurcated slide bar end to limit lever movement in the opposite direction; the flange being vertically slotted from its top edge at the site of the opposed inner ends of said bearings and being bent laterally so as to provide a cracked nut deflector for deflecting the latter toward the opposite side of said flange for deposit in an adjacent receptacle, said deflector being located inwardly of the plane of the adjacent sides of both the first and second bearings whereby to be protected against damage in the event that the nut cracker unit is dropped on a hard surface, and said floating link means comprising separate links located at opposite sides of said flange and lever end.

References Cited by the Examiner

UNITED STATES PATENTS

| 2,783,802 | 3/1957 | Fontaine | 146—16 XR |
| 2,827,087 | 3/1958 | Connor | 146—16 |

WILLIAM W. DYER, Jr., *Primary Examiner.*

W. GRAYDON ABERCROMBIE, *Examiner.*